(12) United States Patent
Garay et al.

(10) Patent No.: US 8,452,984 B2
(45) Date of Patent: May 28, 2013

(54) MESSAGE AUTHENTICATION CODE PRE-COMPUTATION WITH APPLICATIONS TO SECURE MEMORY

(75) Inventors: Juan A. Garay, Guttenberg, NJ (US); Vladimir Kolesnikov, Union City, NJ (US); Hubert Rae McLellan, Summit, NJ (US)

(73) Assignee: Alcatel Lucent, Paris (FR)

( * ) Notice: Subject to any disclaimer, the term of this patent is extended or adjusted under 35 U.S.C. 154(b) by 1295 days.

(21) Appl. No.: 12/229,987

(22) Filed: Aug. 28, 2008

(65) Prior Publication Data

US 2010/0058070 A1 Mar. 4, 2010

(51) Int. Cl.
*G06F 11/30* (2006.01)

(52) U.S. Cl.
USPC .......................................... 713/190

(58) Field of Classification Search
USPC ............... 713/190, 162; 380/28, 44, 46, 277; 711/E12.092
See application file for complete search history.

(56) References Cited

U.S. PATENT DOCUMENTS

| | | | |
|---|---|---|---|
| 6,934,388 B1 * | 8/2005 | Clark | 380/47 |
| 6,963,976 B1 * | 11/2005 | Jutla | 713/181 |
| 8,122,190 B1 * | 2/2012 | Doi | 711/109 |
| 8,161,271 B2 * | 4/2012 | Luick et al. | 712/225 |
| 2002/0029200 A1 * | 3/2002 | Dulin et al. | 705/67 |
| 2009/0103731 A1 * | 4/2009 | Sarikaya | 380/270 |
| 2009/0187771 A1 * | 7/2009 | McLellan, Jr. | 713/193 |
| 2011/0044454 A1 * | 2/2011 | Baek et al. | 380/273 |
| 2011/0302635 A1 * | 12/2011 | Pratt et al. | 726/4 |

OTHER PUBLICATIONS

Bellare, Kilian, and Rogaway. The Security of the Cipher Block Chaining Message Authentication Code. 2000. p. 1-36.*
Black and Rogaway. A Block-Cipher Mode of Operation for Parallelizable Message Authentication. 2002. p. 1-17.*
Ferguson, Niels. A Simple Algebraic representation of Rijndael. 2001. p. 1-9.*
Brassardm Gilles; On computationally Secure Authentication Tags Requiring Short Secret Shared Keys; Advances in Cryptology: Proceedings of Crypto 82; 1983; pp. 79-86; vol. 0, Plenum Press, New York, USA.
Wegman, M. et al; New Hash Functions and Their Use in Authentication and Set Equality; Journal of Computer and System Sciences; Jun. 1981; pp. 265-279; vol. 22; Issue 3; Academic Press, Inc.

* cited by examiner

*Primary Examiner* — Beemnet Dada
(74) *Attorney, Agent, or Firm* — Carmen Patti Law Group, LLC

(57) ABSTRACT

A method comprising the steps of creating a random permutation of data from a data input by executing at least one of a Pseudo-Random Permutation (PRP) and a Pseudo-Random Function (PRF), creating a first data block by combining the random permutation of data with a received second data block and executing an $\epsilon$-differentially uniform function on the result of the combination, XORing the result of the $\epsilon$-DU function evaluation with a secret key, and reducing the first data block to a first message authentication code.

27 Claims, 5 Drawing Sheets

MESSAGE AUTHENTICATION CODE PRE-COMPUTATION WITH APPLICATIONS TO SECURE MEMORY

TECHNICAL FIELD

The present invention is directed to a method and apparatus for pre-computing authentication codes with applications to secure memory.

BACKGROUND

Consumer products, business products and even military equipment become more dependent on computer systems with each passing day. When products incorporate computing equipment, people may try to take advantage of product weaknesses, either to use the product for free or to sabotage the product. In the computing world, hackers, pirates or adversaries may try to take advantage of products that use computing equipment by tampering with the memory of the equipment. Typically there are two main areas of security when it comes to protecting computing integrity: software based and hardware based. Software based security is concerned with the integrity of software. Hardware based security assumes that a hacker has full access to a computing system and may use oscilloscopes and logic analyzers to observe the computing system.

Advances in very large scale integration of circuits on a chip have provided tamper resistant hardware computing systems by integrating complete Systems on a Chip (SoC). Thus integrating the whole computing system onto a chip may stop an adversarial attack. In most practical scenarios, however, insufficient on-chip memory renders this solution unattainable. Programs and data must be stored in off-chip memory. This opens an avenue for an adversary to compromise computing equipment by tampering with off-chip memory.

Signing and encrypting memory is a way to stop an adversary from successfully tampering with off-chip memory. A message signature is like a checksum that may be used to verify that a piece of memory has not changed since it was last read. When data is written to off-chip memory, a signature is generated and stored with the data. When the data is read from off-chip memory, the signature is verified to ensure that data has not changed. Generating a signature can be an expensive operation. Many clock cycles may be used to generate a signature. Thus, generating and checking a memory signature must be efficient.

Message authentication has been a subject of a large amount of research. While most natural MAC schemes involve simple evaluation of a pseudorandom permutation (PRP) on the message concatenated with redundant data (such as a string of 32 zeros), such schemes do not lend themselves to pre-computation.

Another approach to MAC computation uses universal hash functions (UHF). The idea to obtain a MAC from a UHF was first proposed by Carter and Wegman (Wegman, Carter, New Hash Functions and Their Use in Authentication and Set Equality, JCSS, 22:265, 1981). Brassard later proposed to use pseudorandom generators to reduce the size of MAC keys (Gilles Brassard, On computationally secure authentication tags requiring short secret shared keys, in Crypto '82, 79-86.) The resulting construction is as follows: MAC $(m,r)=h(m)$ XOR $F(r)$, where h is a UHF and F is a pseudorandom generator. Since then, a substantial amount of research concentrated on speed and other improvements of the used functions h and F.

The MAC pre-computation construction differs from previously proposed constructions, and possesses properties specifically desired in short message authentication with pre-computation.

SUMMARY

A method in one embodiment, comprising the steps of creating a random permutation of data from a data input by executing at least one of a Pseudo-Random Function (PRF) and a Pseudo-Random Permutation (PRP), creating a first data block by combining the random permutation of data with a received second data block and executing an $\epsilon$-Differentially Uniform ($\epsilon$-DU) permutation. XORing the result of the $\epsilon$-DU function evaluation with a secret key and reducing the first data block to a first message authentication code.

A system in another embodiment comprising a MAC computer wherein the MAC computer creates a random permutation of data from a data input by executing at least one of a Pseudo-Random Function (PRF) and a Pseudo-Random Permutation (PRP), wherein the MAC computer creates a first data block by combining the random permutation of data with a received second data block and executing an $\epsilon$-Differentially Uniform ($\epsilon$-DU) permutation, wherein the MAC computer XORs the result of the evaluation of the $\epsilon$-DU with a secret key, and wherein the MAC computer reduces the first data block to a first message authentication code.

DESCRIPTION OF THE DRAWINGS

Features of example implementations of the invention will become apparent from the description, the claims and the accompanying drawings in which:

DETAILED DESCRIPTION

As discussed, an area of computer security weakness is off-chip memory. An adversary may alter or play back information contained in off-chip memory to subvert a computer system. One way to curtail adversaries is to sign and encrypt off-chip memory. Calculating a signature on memory may entail generating a message authentication code (MAC). A MAC algorithm is run with a key and a block of memory or data as inputs. The MAC algorithm may output a signature or MAC. The MAC may be a value. The MAC may be sixteen or thirty-two bits. The MAC, however, may be larger or smaller. A first MAC is computed with data that is written to off-chip memory. The first MAC is stored with the data. When the data is read from off-chip memory, a second MAC is generated from the data that is read. If the first MAC does not match the second MAC, the system may reset and/or discard the data.

Figure 1:
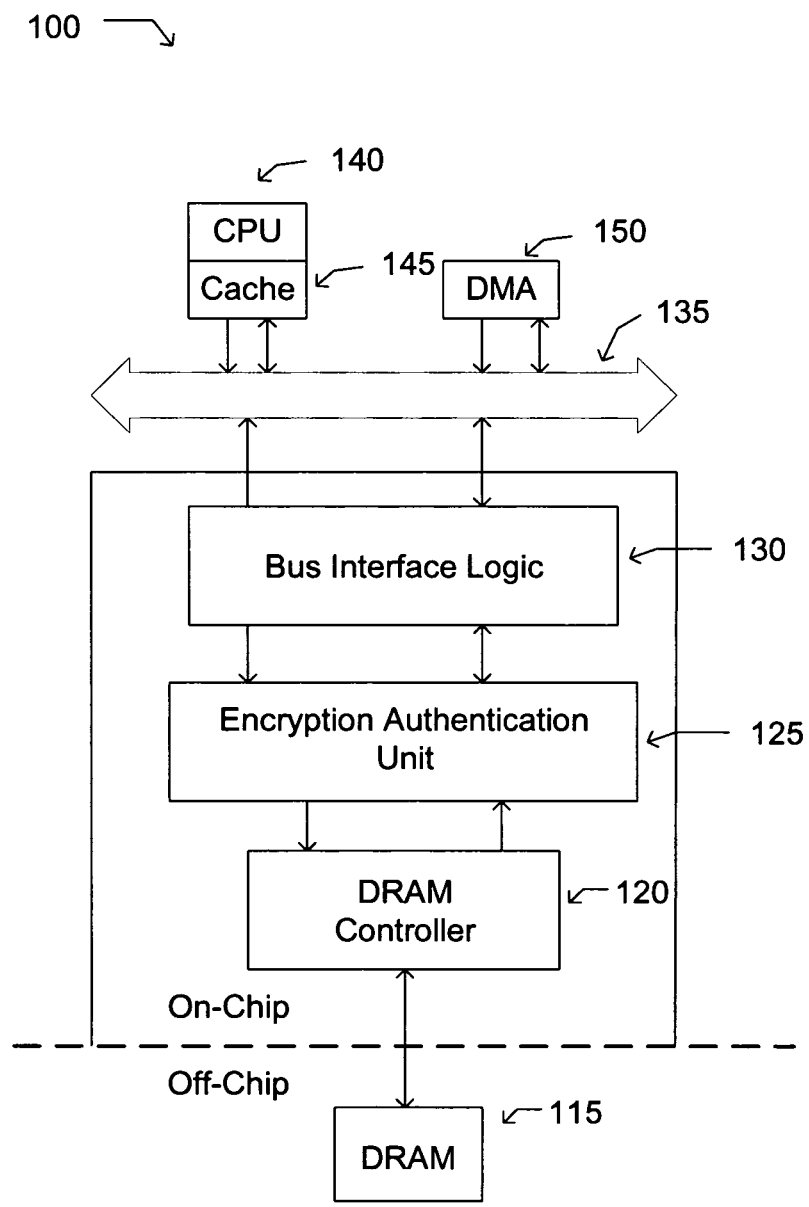
FIG. 1 is a sample block diagram of a computer system where the apparatus and method for MAC pre-computation may reside.

Turning to FIG. 1, which is a sample block diagram of a system 100 where the apparatus and method for MAC pre-computation may reside. The main components of the system 100 are either on-chip or off-chip. The off-chip component of the system is memory in the form of dynamic random access memory (DRAM) 115. The DRAM may store data that is used by the software or programs resident on the on-chip portion of the system. Although DRAM is depicted in this embodiment, DRAM, random access memory, or any other memory or method of storing data may be used to store off-chip data in the system 100.

The components that reside on-chip may include a DRAM controller 120, an encryption authentication unit 125, bus interface logic 130, a bus 135, a central processing unit 140 and cache 145, and a direct memory access (DMA) engine 150.

The CPU 140 and DMA engine 150 may communicate with the bus interface logic 130 via the bus 135. The bus interface logic 130 may be communicatively coupled to the EAU 125. The EAU 125 may be further communicatively coupled to the DRAM controller 120. The DRAM controller may be communicatively coupled to the DRAM 115.

The CPU 140 and DMA 150 may read and write data to DRAM 115. When the CPU 140 or DMA 150 reads or writes to DRAM 115, the data that is read or written flows through the bus interface logic 130, the EAU 125 and the DRAM controller 120. In reading and writing data, the bus interface logic 130 handles transactions of all sizes. The EAU 125, however, reads and writes fixed sized blocks of data to off-chip DRAM 115. The fixed sized blocks may be called encryption blocks or data blocks. In an embodiment, a data block comprises two hundred fifty-six bits. An encryption block may be a minimal unit of data to be read or written memory 115. Because the bus interface logic 130 handles transactions of all sizes, the EAU 125 has to manage a request to read or write data that is larger or smaller than an encryption block.

In an embodiment, the method and system for message authentication code pre-computation may reside on the EAU 125. The EAU 125 may perform encryption/decryption and authentication of data that is written or read from DRAM 115. Write transactions may be encrypted on the way out to DRAM 115. Read transactions may be authenticated and decrypted as information is read from DRAM 115. Thus any data blocks the EAU 125 writes or reads from memory may contain encrypted data.

When authenticating data or memory, the EAU 125 may generate a first MAC for a data block that the EAU 125 writes to memory. The first MAC is then associated with the data block. When the data block is read from memory, the EAU 125 may generate a second MAC based on the data that is read. The second MAC may be compared with the first MAC. If the first MAC and second MAC do not match, the memory may have been corrupted or compromised. If memory is corrupted, the EAU 125 may perform memory corruption procedures. This may entail resetting the system, or sending a message to the CPU to inform the CPU of the memory anomaly. The CPU may then reset the system or take some other preventive actions.

Typically, the EAU 125 receives the address of a memory transaction before data associated with the memory transaction arrives. Thus a majority of the computation involving encrypting the data and generating a MAC may be performed before the data arrives.

Figure 2:
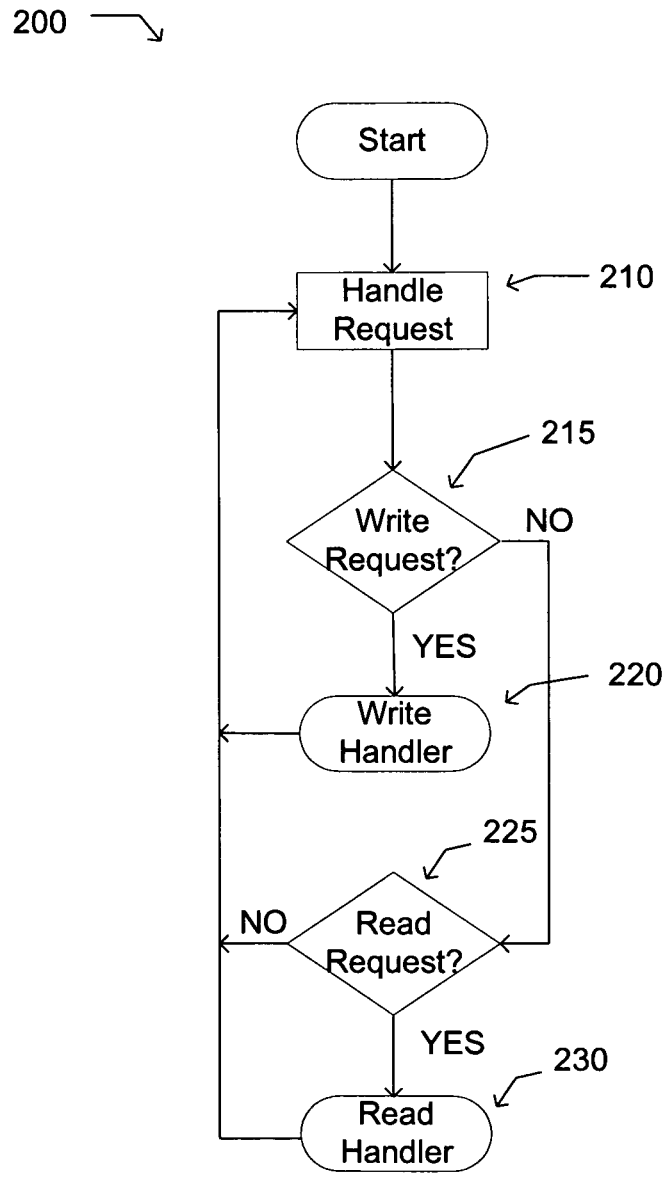
FIG. 2 is an example of a method that may be used in writing and reading data using a MAC pre-computation.

Turning to FIG. 2, which is one example of a method 200 that may be used in writing and reading data employing MAC pre-computation with applications to secure memory. The method 200 may reside on the encryption authentication unit 125. The method first handles a request 210. The request may be a request to read or write data. The request may come through the bus interface logic 130. When the bus interface logic 130 sends a request to read or write data, the bus interface logic 130 may pass an address to the method 200. If the request is a write request, the address may be an address where data is to be written. If the request is a read request, the address may be an address where data is to be read from.

The method 200 then determines if the request is a write request 215. If the request is a write request, the method 200 invokes the write handler 220. Because this is a write request, the bus interface logic 130 may pass a write address to the method 200. When the method 200 invokes the write handler, the method 200 may pass the address or write address to the write handler. After the write handler is done processing the request, the method 200 continues handling requests 210.

If the incoming request is not a write request, the method 200 determines if the request is a read request 225. If the request is not a read request, the method 200 returns to handling requests 210. If the request is a read request, the method 200 may invoke the read handler 230. When the method 200 invokes the read handler, the method 200 may pass the address or read address to the read handler.

Figure 3:
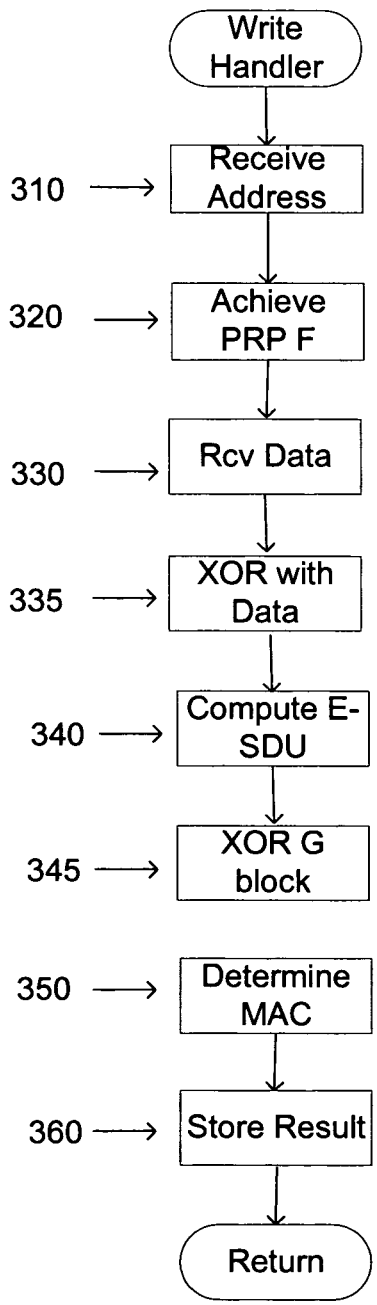
FIG. 3 is a method of writing data to memory using MAC pre-computation.

Turning to FIG. 3, a method in one example, which may write data to DRAM 115 using MAC pre-computation. The write handler method or write handler 300 may reside on-chip as part of the EAU 125. As the EAU 125 receives data, the EAU 125 may generate a MAC and may also encrypt the data. This process begins when the write handler receives an address 310. The address may be the location in DRAM 115 where the EAU 125 is supposed to write the data. The address may be a thirty-two bit address, a sixteen bit address or any other sized address that may be used to address the DRAM 115. For the sake of illustration, we will assume the address is thirty-two bits long. At this point, the data may not have arrived.

Because the address is now available, the MAC calculation may commence. The method 300 does not have to wait for data to arrive to begin MAC calculations. The EAU 125 may create a two hundred fifty-six bit data block by concatenating two hundred eight bits of zeros (pad), the thirty-two bit address and a sixteen bit nonce (zeros, address, and nonce). The two hundred fifty-six bit data block may be a data input. Part of calculating the MAC may involve evaluating a PRF or PRP or randomness using the data input. One of ordinary skill in the art will readily appreciate that a PRF/PRP is an idealized block cipher, where the cipher results in a bit pattern that cannot be distinguished from randomness. Part of calculating the MAC may also involve evaluating an epsilon differentially uniform ($\epsilon$-DU) function. It will be readily apparent to one of ordinary skill in the art that a $\epsilon$-DU function may be a block cipher that results in a random bit pattern. The randomness of a bit pattern created by an $\epsilon$-DU function, however, is not as good as that of a bit pattern generated by a PRP. Thus, a bit pattern generated by an $\epsilon$-DU may not be as secure as a bit pattern generated by a PRP. One of ordinary skill in the art will also readily recognize that a nonce, or number used once, is a number that is rarely if ever repeated. In this embodiment, the nonce may be a counter that is incremented each time a write is executed.

A PRP or PRF function F may be used to create the level of randomness needed in ciphering the nonce, address, and zeros. The method 300 may run Rijndael (or it's most popular instantiation, Advanced Encryption Standard or AES) F 320. The method 300 may run fourteen rounds of Rijndael on the data input (zeros, address and nonce) to achieve two hundred and fifty-six bits of randomness. The two hundred and fifty-six bits of randomness may be a Rijndael write block or Rijndael block. The random values or randomness may be, for example, a series of ones and zeros. Note, in some embodiments, PRP F may be achieved by running ten rounds of AES version of Rijndael on two sets of one hundred and twenty-eight bits. The two sets of one hundred twenty-eight bits are concatenated to form a two hundred and fifty-six bit block. When running Rijndael, the method 300 chooses a random key, k1. The Rijndael algorithm may use the key k1 as an input to the Rijndael algorithm. A random or secret key is a key that is chosen randomly. For example, a random number generator may be used to choose a random key. Other forms of random generation may be used to choose a random key.

The method 300 receives write data 330. When the method 300 receives write data, the method 300 may encrypt the data. The method 300 may encrypt the data by using AES, or any other method of encrypting the data. The encrypted data may be XORed with the Rijndael write block 335. The result may be an XORed Rijndael write block. The XORed Rijndael write block may comprise two hundred and fifty-six bits.

The method 300 may compute a function G of an $\epsilon$-DU family of functions. The method 300 may choose a second random key, K2 which may be used as input to $\epsilon$-DU family of functions. The $\epsilon$-DU function G may be run on the XORed Rijndael write block 340. Function G may be an evaluation of two or four rounds of Rijndael on the XORed Rijndael write block which results in a two hundred and fifty-six bit G write block. The G write block may be XORed with a two hundred fifty-six bit key 345, k3, which results in a two hundred fifty-six bit M block. The M block may be collapsed from two hundred fifty-six bits to a thirty-two bit MAC or first MAC by using an XOR tree 350. The encrypted data block may be stored in DRAM 360. The thirty-two bit first MAC and the nonce, may also be stored in DRAM 360 and associated with the encrypted data block. Thus when the encrypted data needs to be authenticated, the information needed to perform the authentication may be retrieved. The keys, k1, k2, and k3, may be stored on the EAU.

Although in this example, the method and apparatus for pre-computing a MAC was used in writing data to memory, the method and apparatus may be used in any application that involves writing or sending data. In other embodiments, rather than using a memory address to pre-compute a MAC, other values may be used to compute a MAC. For example, if the method and apparatus is used in a message application, a message context identifier may be used in place of an address. Furthermore, the size of the address, nonce and other variables may vary depending on a user's need and the application for which the method is used.

Figure 4:
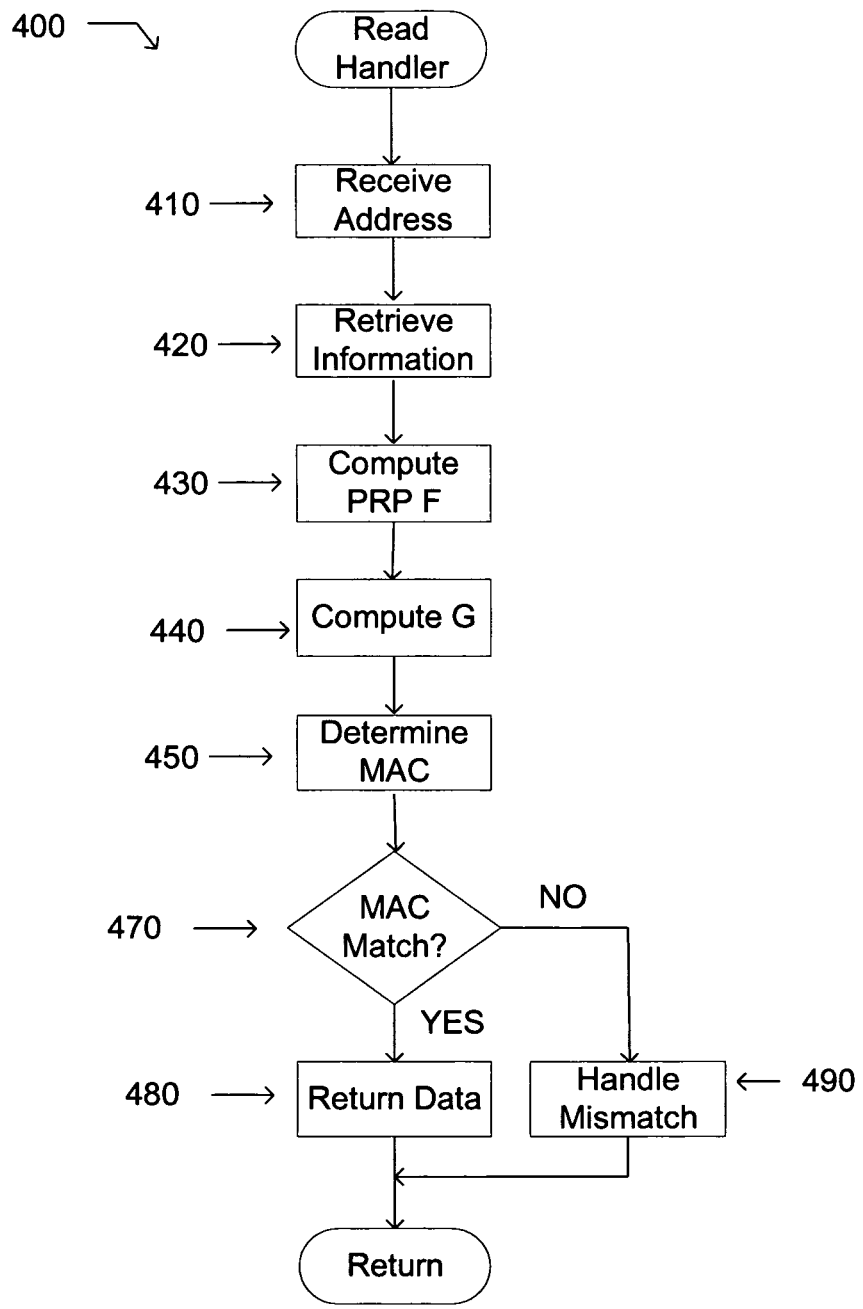
FIG. 4. is a method of reading and authenticating data from memory using MAC pre-computation.

Turning to FIG. 4, which is a method 400 in one example that may read data from DRAM 115. In the process of reading data from DRAM 115, the method 400 may authenticate the data. Authenticating the data may entail generating a second MAC based on the stored data and comparing the second MAC with the first MAC that was originally stored with the data. The method 400 may receive an address or read address 410 from the bus interface logic 130.

The method 400 may retrieve information 420 needed to authenticate the data. This information may include information that may reside on-chip such as the keys, k1, k2 and k3. Further, this information may include information that may reside off-chip such as the first MAC, a nonce and read data resident at the read address. The read data may be encrypted data.

The method 400 may compute PRP F 430 on the address, nonce and zeros (zero pad) as described in relation to FIG. 3. The key k1 is needed to compute PRP F. Note, the key k1 that is used to compute PRP F when authenticating or reading the data, may be the same key k1 that was used to compute the PRP F when writing the data. As previously described, PRP F may be achieved by running fourteen rounds of Rijndael on the nonce, the address and two hundred eight bits of zeros 430. The result of the fourteen rounds of Rijndael may be two hundred fifty-six bits of randomness that may be a Rijndael block. F may also be achieved by running in parallel two instances of ten-round one hundred twenty eight bit AES version of Rijndael. When reading data, the Rijndael block may be referred to as a Rijndael read block.

In computing G 440, the Rijndael read block may be XORed with the read data. The result may be an XORed Rijndael block or XORed Rijndael read block. G may be achieved running two or four rounds of Rijndael on the XORed Rijndael read block. The result of computing G 440 may be a two hundred and fifty-six bit G block or G read block. Note, the same key k2 used to compute the G write block may be used to compute the G read block.

The G read block may be XORed with the key, k3, to arrive at a two hundred fifty six bit M read block. The M read block may be reduced to a thirty-two bit second MAC via an XOR tree 450. The second MAC may be compared with the first MAC 470. Recall that the first MAC was generated when the data was originally written to DRAM 115. If the first MAC and the second MAC are not equal, the data may have been corrupted or compromised. The method 400 handles the mismatch 490 by performing memory corruption response procedures. If the first MAC and the second MAC are equal, the method 400 may return the read data to the bus interface logic 130. The data may also be passed to the CPU prior to MAC verification, since MAC failure may cause a system reset. The described methods 300, 400 may be known as shallow MAC or shMAC.

Figure 5:
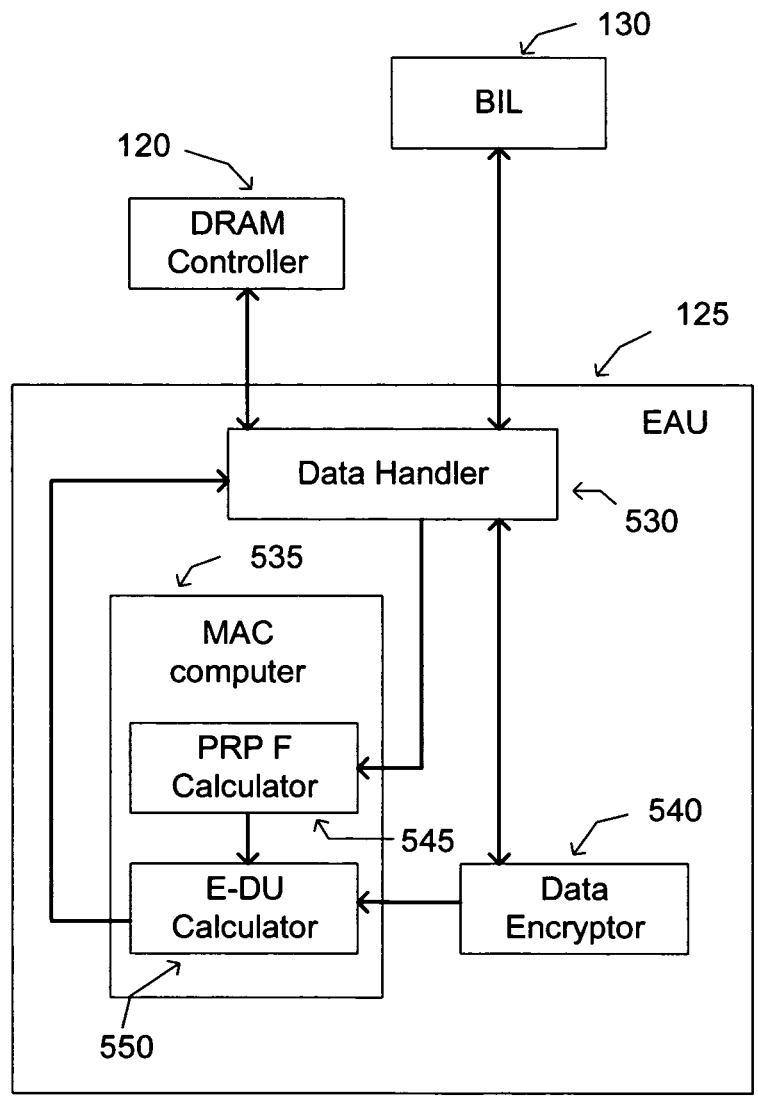
FIG. 5 is an embodiment of a system that may comprise an apparatus for performing MAC pre-computation.

Turning to FIG. 5, which depicts an embodiment of a system 550 that may comprise an apparatus for performing MAC pre-computation. The system 500 may be comprised of a bus interface logic unit 130, a DRAM controller 120 and an EAU 125. The EAU 125 may be further comprised of a data handler 530, a MAC computer 535 and a data encryptor 540. The MAC computer 535 may be further comprised of a MAC PRP F calculator 545 and an $\epsilon$-DU calculator 550.

As previously described, the EAU 125 may be communicatively coupled to the DRAM controller 120 and the bus interface logic 130. The DRAM controller 120 and bus interface logic 130 may be communicatively coupled to the data handler 530. The data handler 530 may be a node or component that is capable of reading and writing data external to the EAU 125. A node or component may be software, firmware, hardware or any other type of apparatus capable of performing computation.

The data handler 530 may also be communicatively coupled to the MAC computer 535 and the data encryptor 540. The MAC computer 535 may be a node or component that is capable of pre-computing a MAC. The data encryptor 540 may be a node or component that is capable of encrypting data.

The MAC computer 535 may be further comprised of the PRP F calculator 545 and an $\epsilon$-DU 550 calculator. The PRP F calculator 545 is a component or node that may be capable of computing a PRP F function. The $\epsilon$-DU 550 calculator is a component that may be capable of computing an $\epsilon$-DU function.

The bus interface logic 130 may send a request to read or write data from DRAM 115. The data handler 530 may receive the request. The request to write data may come in two parts. First, the bus interface logic 130 may send an address to the data handler 530. In typical systems, two or more clock cycles later, the data handler 530 may receive write data associated with the address. When reading data, the bus interface logic 130 may send the read address. The data handler may respond by sending the read data to the bus interface logic 130.

If the data handler 530 receives a write request, the data handler 530 may forward the write address to the MAC computer 535 and the data encryptor 540. In some embodiments, the write address may be thirty-two bits. The data encryptor 540 may use the write address as part of the process of encrypting data. The MAC computer 535 may forward the write address and a nonce to the PRP F calculator 545. In some embodiments, the nonce may be sixteen bits. The PRP F calculator 545 may generate a random key, K1, to use in executing a Rijndael function. The PRP F calculator may use K1 to run fourteen rounds of Rijndael (or two parallel instances of two-round one hundred twenty eight-bit AES version of Rijndael) on a two hundred fifty-six bit data input. The data input may be comprised of two hundred eight bits of zeros, thirty-two bits of address and sixteen bits of nonce. The output of running fourteen rounds of Rijndael on the data input may be two hundred fifty-six bits of random data that may be called a Rijndael block or Rijndael write block. The PRP F calculator 545 may pass the Rijndael write block to the ∈-DU calculator 550. In some embodiments, the write data has yet to arrive at this point. Nevertheless, the PRP F calculator 545 has run Rijndael and created Rijndael write block.

When the write data arrives the data handler 530 may forward the write data to the data encryptor 540. The data encryptor 540 may encrypt the data and pass the encrypted data to the ∈-DU calculator 550. The ∈-DU calculator 550 may XOR the encrypted data with the Rijndael write block. The result may be a two hundred fifty-six bit XORed Rijndael block or XORed Rijndael write block. The ∈-DU calculator 550 may generate or choose a random key, K2, at initialization. The ∈-DU calculator 550 may use K2 in running two or four rounds of Rijndael on the XORed Rijndael write block. The result of running four rounds of Rijndael on the XORed Rijndael write block may be a two hundred fifty-six bit G write block. The G write block may be XORed with a two hundred fifty-six bit key, K3, to arrive at a two hundred fifty-six bit M block.

The two hundred fifty-six bit M block may be collapsed to a thirty-two bit MAC or first MAC via an XOR tree. The encrypted data may be written to DRAM 115. The nonce and first MAC may also be stored off-chip and associated with the encrypted data that is written to DRAM 115.

When data handler 530 receives a read request, the data handler 530 may receive a read address with the read request. The data handler 530 may pass the read address to the MAC computer 535. The MAC computer 535 may retrieve from off-chip memory, a first MAC, a nonce, and read data. The MAC computer 535 may also retrieve the keys, K1, K2 and K3 that was stored on-chip when the read data was written to DRAM 115. The MAC computer 535 may pass the keys, the first MAC, the nonce and the read data to the PRP F calculator 545. The PRP F calculator 545 may use K1 to run fourteen rounds of Rijndael on a two hundred fifty-six bit data block comprised of two hundred eight bits of zeros (zero pad), the thirty-two bit address and the sixteen bit nonce. Alternatively, in correlation with the write handler, the PRP F calculator 545 may run in parallel two instances of two-round one hundred twenty eight-bit AES version of Rijndael). The output of running Rijndael may be two hundred fifty-six bits of random data that may be called a Rijndael block or Rijndael read block. The PRP F calculator 545 may pass the Rijndael read block to the ∈-DU calculator 550.

The ∈-DU calculator 550 may XOR the encrypted read data with the Rijndael read block. The result may be a two hundred fifty-six bit XORed Rijndael block or XORed Rijndael read block. The ∈-DU calculator 550 may use K2 in running four rounds of Rijndael on the XORed Rijndael read block. The result of running two or four rounds of Rijndael may be a two hundred fifty-six bit G block or G read block. The G read block may be XORed with a two hundred fifty-six bit key, K3, to arrive at a two hundred fifty-six bit M block or M read block.

The two hundred fifty-six bit M read block may be collapsed to a thirty-two bit second MAC via an XOR tree. The second MAC may be compared to the first MAC. If the second MAC is not equal to the first MAC, the read data may have been compromised or corrupted. If memory is compromised or corrupted, the MAC computer 535 may perform memory corruption response procedures.

The system and methods for message authentication code pre-computation may be stateless. Authentication and encryption algorithms that are stateless may open memory up to replay attacks. For example, an adversary may replace a location of memory with a value that was previously stored in the same location of memory. Similarly, an adversary may simply not update DRAM during a write transaction. These attacks may result in memory that is mistaken as valid after decryption and authentication.

For purposes of efficiency, encryption and authentication keys may be created for the whole memory or large portions of memory. In an effort to thwart the previously described replay attacks, encryption and authentication keys associated with memory may be periodically refreshed.

An embodiment of memory key refreshing may comprise dividing memory into two regions. Memory is an ordered array that may be divided into a first region and a second region. The first region and the second region may be separated by a boundary address. The first region may be encrypted and authenticated with a first set of keys. The second region may be encrypted and authenticated with a second set of keys. The refresh method comprises growing one region of memory at the expense of the other region. Thus the second region may grow until the boundary of the second region reaches the end of memory. The end of memory may be a highest addressable address or a lowest addressable address.

As data is written to the second region of memory, the second set of keys may be used to decrypt and authenticate data. When the boundary reaches the end of memory, for example the boundary reaches the lowest addressable address, the keys for the first region of memory may be retired and a new third set of keys may be generated for the first region of memory. As data is written to memory, the data is encrypted and authenticated using the third set of keys and the data is placed in the first region of memory. The first region of memory may be grown at the expense of the second region of memory. This continues until the boundary again reaches the end of memory, for example the highest addressable address of memory. The method continues by generating a fourth set of keys. As new data is written to memory, the data is encrypted and authenticated using the fourth set of keys and the data is placed in the second region of memory. This method of regenerating keys and writing to separate regions of memory continues.

The system 500 in one example comprises a plurality of components such as one or more of computer software components. A number of such components can be combined or divided in the system 500. An example component of the system 500 employs and/or comprises a set and/or series of computer instructions written in or implemented with any or a number of programming languages, as will be appreciated by those skilled in the art. The system 500 in one example comprises a vertical orientation, with the description and figures herein illustrating one example orientation of the system 500, for explanatory purposes.

The system 500 in one example employs one or more computer-readable signal-bearing media. The computer-readable signal-bearing media store software, firmware and/or assembly language for performing one or more portions of one or more implementations of the invention. The computer-readable signal-bearing medium for the system 500 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the system 500 and method 200, 300, 400. For instance, the steps may be performed in a differing order, or steps may be added, deleted, or modified.

Although example implementations of the system 500 and method 200, 300, 400 have been depicted and described in detail herein, it will be apparent to those skilled in the relevant art that various modifications, additions, substitutions, and the like can be made without departing from the spirit of the method 200, 300, 400 and these are therefore considered to be within the scope of the system 500 and method 200, 300, 400 as defined in the following claims.

We claim:

1. A method comprising the steps of:
creating, via a message authentication code (MAC) computer, a random permutation of data from a data input by executing at least one of a Pseudo-Random Function and a Pseudo-Random Permutation;
creating, via the MAC computer, a first data block by combining the random permutation of data with a received second data block and executing an $\epsilon$-differentially uniform function on the result of the combination;
XORing, via the MAC computer, the result of the $\epsilon$-differentially uniform function evaluation with a secret key; and
reducing, via the MAC computer, the first data block to a first message authentication code;
wherein the data input comprises a memory address, and the random permutation of data is created independent of the received second data block.

2. The method of claim 1 wherein
the data input also comprises a zero pad and a nonce, the first data block comprises a Rijndael XORed block and the received second data block comprises an encrypted data block; and
wherein the step of creating the random permutation of data further comprises a step of creating a Rijndael block; and
wherein the step of creating the first data block further comprises a step of creating a Rijndael XORed block by XORing the Rijndael block with the encrypted data block; and
wherein a G block is created by executing the $\epsilon$-differentially uniform function on the Rijndael XORed block; and
wherein the step of XORing of the result of the $\epsilon$-differentially uniform function evaluation with the secret key results in an M block; and wherein the step of reducing the first data block to the first message authentication code further comprises a step of reducing the M block to the first message authentication code via an XOR tree.

3. The method of claim 2 wherein the step of creating the random permutation of data from the data input further comprises a step of creating the random permutation of data from the data input before write data arrives.

4. The method of claim 3 wherein the step of creating the Rijndael block further comprises executing at least one of:
fourteen rounds of a Rijndael function on the address, the nonce, and the zero pad; and
two instances of ten rounds of an advanced encryption standard function on the address, the nonce, and the zero pad.

5. The method of claim 4 wherein the step of creating a Rijndael block further comprises a step of choosing a first random key that is used in creating the Rijndael block.

6. The method of claim 5 wherein creating the G block further comprises executing at least one of:
two rounds of a Rijndael function on the XORed Rijndael block; and
four rounds of a Rijndael function on the XORed Rijndael block.

7. The method of claim 6 wherein creating the G block further comprises choosing a second random key that is used in creating the G block.

8. The method of claim 7 wherein the encrypted data is written to off-chip memory, the nonce is written to off-chip memory and the first message authentication code is written to off-chip memory.

9. The method of claim 8 wherein the secret key is a third random key, and the first random key, second random key and the third random key are stored on-chip.

10. The method of claim 7 wherein the secret key is a third random key, and wherein the encrypted data is associated with the nonce, the MAC, the first random key, the second random key and the third random key.

11. The method of claim 7 further comprising authenticating a read data block by retrieving the secret key, the first random key and the second random key, the first message authentication code, and the nonce; and
creating a second message authentication code from the secret key, the first random key and the second random key, the first message authentication code, and the nonce.

12. The method of claim 11 wherein creating the second message authentication code further comprises:
creating a Rijndael read block by executing the Rijndael function on a read address, the nonce, and a zero pad;
creating a Rijndael XORed read block by XORing the Rijndael read block and an encrypted read data block;
creating a G read block by executing at least one of four rounds and two rounds of the Rijndael function on the XORed Rijndael block;
creating an M read block by XORing the G block with the secret key; and
reducing the M read block to the second message authentication code via an XOR tree.

13. The method of claim 12 wherein creating the Rijndael read block further comprises executing at least one of:
fourteen rounds of Rijndael function on the address, the nonce and the zero pad; and
two instances of ten rounds of an advanced encryption standard function on the address the nonce, and the zero pad.

14. The method of claim 12 wherein authenticating the read data block further comprises a step of comparing the first message authentication code with the second message authentication code and performing memory corruption procedures if the first message authentication code is not equal to the second message authentication code.

15. A system comprising:
a message authentication code (MAC) computer configured to:
create a random permutation of data from a data input by executing at least one of a Pseudo-Random Permutation and a Pseudo-Random Function;
create a first data block by combining the random permutation of data with a received second data block and executing an $\epsilon$-differentially uniform function on the result of the combination;
XOR the result of the evaluation of the $\epsilon$-differentially uniform function with a secret key; and
reduce the first data block to a first message authentication code;
wherein the data input comprises a memory address, and the random permutation of data is created independent of the received second data block.

16. The system of claim 15 wherein
the data input comprises a zero pad and a nonce;
the MAC computer comprises a PRP F calculator and an $\epsilon$-DU calculator, a data handler and a data encryptor;
the MAC computer is communicatively coupled to the PRP F calculator, the $\epsilon$-DU calculator, the data handler and the data encryptor;
the PRP-F calculator is communicatively coupled to the data handler and the $\epsilon$-DU calculator;
the $\epsilon$-DU calculator is communicatively coupled to the data handler and the data encryptor;
the data handler is configured to send a memory address to the PRP F calculator and the data encryptor; and
the PRP F calculator is configured to create the random permutation of data by creating a Rijndael block by executing fourteen rounds of a Rijndael function on the memory address, a nonce, and the zero pad.

17. The system of claim 16 wherein the creation of the random permutation of data further comprises the creation of the random permutation of data before write data is received.

18. The system of claim 17 wherein
the data handler is configured to send a second data block to the data encryptor; and
wherein the data encryptor is configured to encrypt the second data block and to send the encrypted data block to the $\epsilon$-DU calculator; and
wherein the $\epsilon$-DU calculator is configured to create a Rijndael XORed block by XORing the Rijndael block and the encrypted data block; and
wherein the $\epsilon$-DU calculator is configured to create a G block by executing at least one of four rounds and two rounds of a Rijndael function on the Rijndael XORed block; and
wherein the MAC computer is configured to create an M block by XORing the G block with a secret key; and
wherein the MAC computer is configured to reduce the M block to the first message authentication code via an XOR tree.

19. The system of claim 18 wherein the creation of the Rijndael block further comprises a selection of a first random key that is used in the creation of the Rijndael block.

20. The system of claim 19 wherein the creation of the G block further comprises a selection of a second random key that is used in creating the G block.

21. The system of claim 20 wherein the encrypted data is written to off-chip memory, the nonce is written to the off-chip memory and the first message authentication code is written to the off-chip memory.

22. The system of claim 21 wherein the secret key is a third random key, and wherein the first random key, the second random key and the third random key are stored on-chip.

23. The system of claim 20 wherein the secret key is a third random key, and the encrypted data is associated with the nonce, the MAC, the first random key, the second random key and the third random key.

24. The system of claim 20 wherein the MAC computer is configured to authenticate a read data block via:
a retrieval of the secret key, the first random key and the second random key, the first message authentication code, and the nonce; and
a delivery of the secret key, the first random key and the second random key, the first message authentication code, and the nonce to the PRP F calculator of the MAC computer.

25. The system of claim 24 wherein the generation of the second message authentication code further comprises:
the PRP F being configured to create a Rijndael read block by executing the Rijndael function on a read address, the nonce, and the zero pad;
the PRP F being configured to pass the Rijndael read block to the $\epsilon$-DU calculator;
the $\epsilon$-DU calculator being configured to create a Rijndael XORed read block by XORing the Rijndael read block and an encrypted read data block;
the $\epsilon$-DU calculator being configured to create a G read block by executing at least one of four rounds and two rounds of a Rijndael function on the XORed Rijndael block;
the MAC computer being configured to create an M read block by XORing the G block with the secret key; and
the MAC computer being configured to reduce the M block to a second message authentication code via an XOR tree.

26. The system of claim 25 wherein the execution of the Rijndael function further comprises the execution of at least one of:
fourteen rounds of the Rijndael function on the read address, the nonce, and the zero pad; and
two parallel executions of ten rounds of the Rijndael function on the read address, the nonce, and the zero pad.

27. The system of claim 26 wherein the authentication of the read data block further comprises the MAC computer being configured to compare the first message authentication code with the second message authentication code and to perform memory corruption procedures in the event that the first message authentication code is not equal to the second message authentication code.

* * * * *